UNITED STATES PATENT OFFICE.

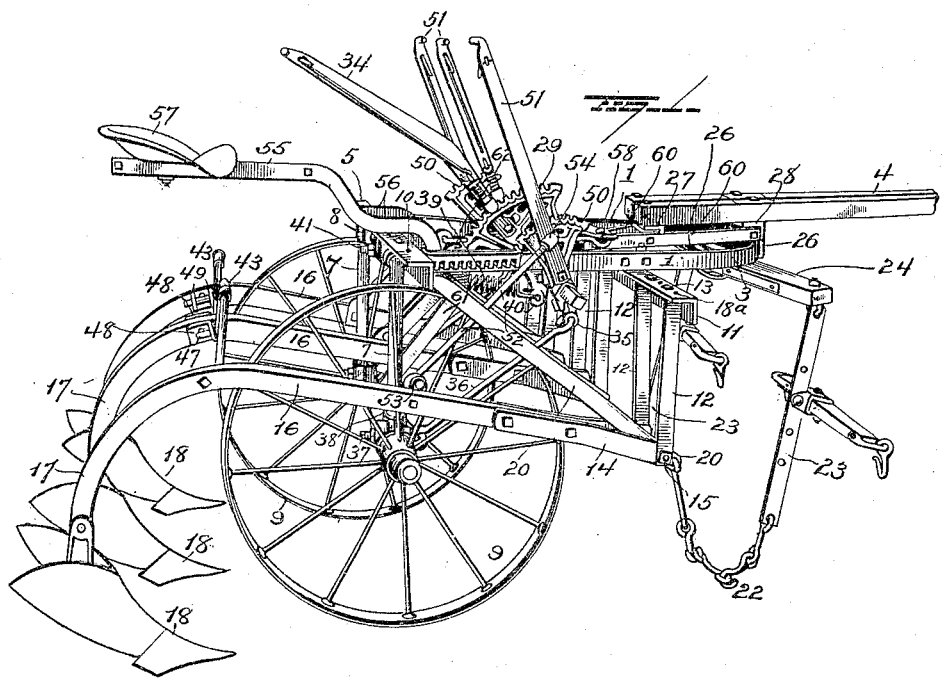
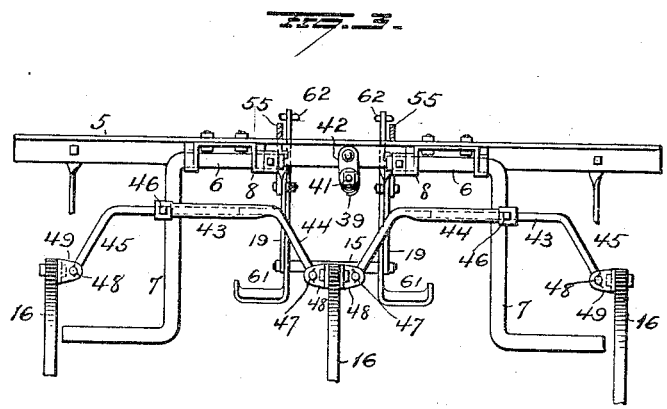

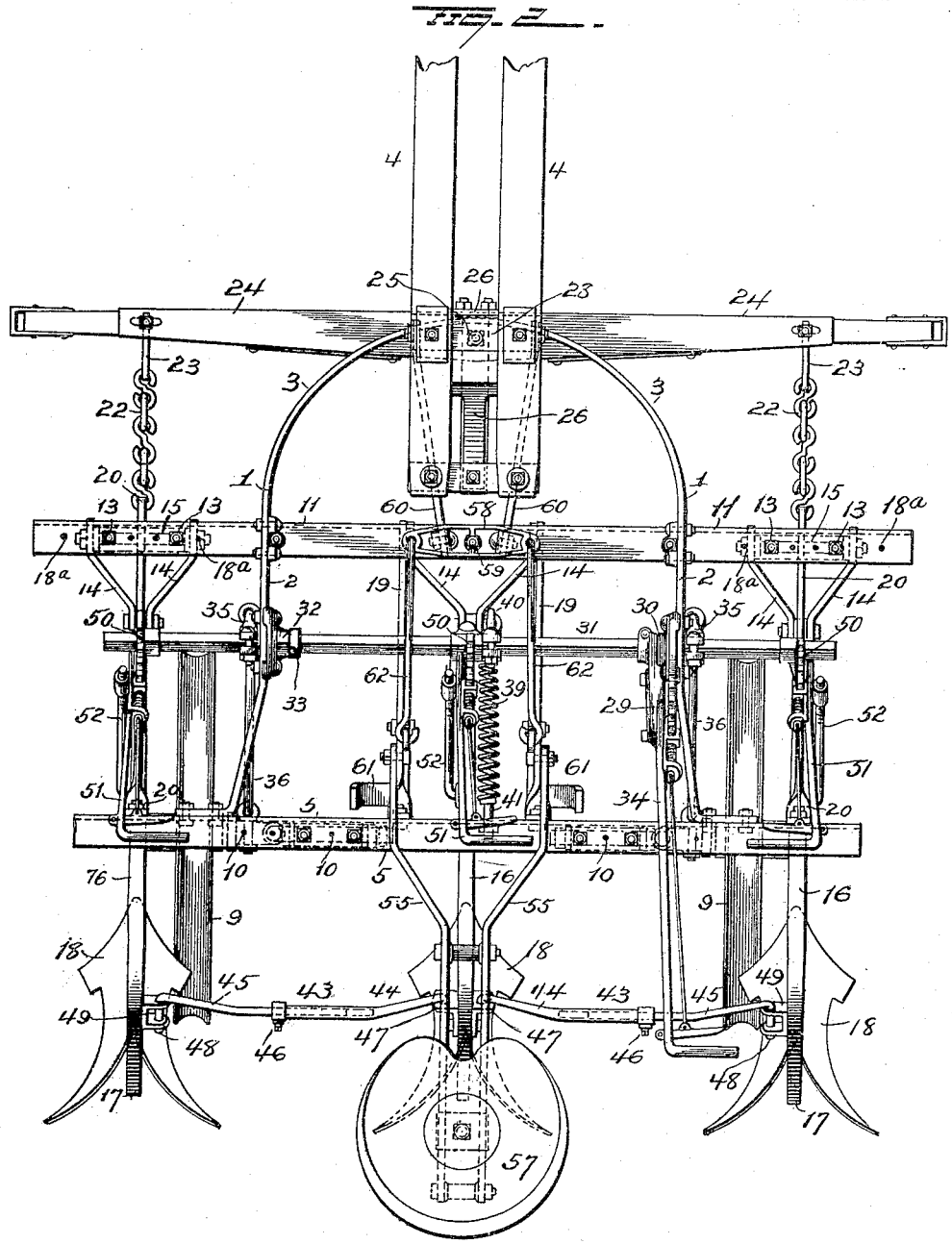

RUDOLPH J. ALTGELT, OF BUENOS AIRES, ARGENTINA, ASSIGNOR TO OLIVER CHILLED PLOW WORKS, OF SOUTH BEND, INDIANA.

CULTIVATOR.

1,205,959.     Specification of Letters Patent.     Patented Nov. 28, 1916.

Application filed February 26, 1915. Serial No. 10,787.

*To all whom it may concern:*

Be it known that I, RUDOLPH J. ALTGELT, a citizen of the United States, residing at Buenos Aires, in Argentina, have invented certain new and useful Improvements in Cultivators; and I do hereby declare the following to be a full, clear, and exact description of the invention, such as will enable others skilled in the art to which it appertains to make and use the same.

This invention relates to improvements in cultivators,—one object of the invention being to so construct a cultivator and operating mechanism therefor, that the several cultivator beams and bodies may be raised and lowered simultaneously or separately, and so that the cultivator beams and bodies and their operating mechanism may be adjusted laterally to increase or decrease the spacing of the same, so that the cultivator may be readily made adaptable to the spacing of the rows in a given instance.

A further object is to provide improved means for steering the machine in such manner as to keep the plow bodies in proper positions with relation to the rows, even though the team may be more or less diverted.

With these and other objects in view, the invention consists in certain novel features of construction and combinations of parts as hereinafter set forth and pointed out in the claims.

In the accompanying drawings: Figure 1 is a view of a cultivator embodying my improvements; Fig. 2 is a plan view; and Fig. 3 is a fragmentary rear view, partly in section.

1 represents a horizontal frame which may be made in a single piece comprising parallel side members 2 and a curved forward end 3,—which latter also serves as a track or guide-way for a part carried by the tongue 4, as more fully hereinafter explained.

The rear ends of the side members of the U-shaped horizontal frame 1, are rigidly secured to a rear cross beam 5 which may be made of angle iron and of a length appreciably greater than the width of the frame 1. The upper members 6 of crank axles 7 are connected with the rear cross beam 5, through the medium of brackets 8 and the lower or journal members of said crank axles are mounted in the hubs of carrying wheels 9.

The bearing brackets 8 in which the upper arms of the crank axles are mounted, are secured to rear cross beam by means of suitable bolts and said cross beam is provided with such a plurality of holes 10 for said bolts as will permit the bearing brackets to be secured at different positions and thus provide for lateral adjustment of the crank axles and wheels when it is desired to increase or decrease the width of the machine.

A forward cross beam 11 (which also may be made of angle iron) is disposed transversely of the frame 1 rearwardly of the curved or semicircular forward end thereof, and is of a length approximately equal to that of the rear cross beam 5. Pairs of hangers 12 are secured at their upper ends to the forward cross beam by means of bolts 13 and to the lower ends of the hangers of each pair, the members of a coupling fork 14 are pivotally connected by means of a transverse bolt 15,—said coupling fork constituting means for connecting a plow or cultivator beam 16 with the pair of hangers. The rear ends of the plow beams 16 may be curved downwardly to form standards 17, to which the plow or cultivator bodies or soil engaging members 18 are secured. The forward cross beam is provided with such numbers of holes 18ᵃ for the bolts 13 as will permit the pairs of hangers near the ends of the cross beam to be adjusted laterally, thus providing for lateral adjustment of the two outer plows relatively to the central plow. It will be observed that three plows or cultivator units are provided (one between the carrying wheels and the other two outside of said wheels), and that the pairs of hangers together with connecting portions under the cross beam 11 constitute front arches with which the several plows or cultivator units are pivotally connected. It will be apparent that to accomplish lateral adjustment of the plows to vary the distance between any two of them, it is necessary to provide for adjusting the supporting means for the outer plows only,—the connections of the central plow always retaining their centrally located positions.

Braces 19 are secured at their forward ends to the bolt 15 at the lower ends of the central pair of hangers 12 (near respective ends of said bolt) and at their upper rear ends said braces are secured to the intermediate portion of the rear cross beam 5.

Similar braces 20 are adjustably secured to the end portions of the rear cross beam 5 and near their forward ends, these braces are mounted on the transverse bolts 15 which connect the hangers of the end pairs of hangers. The lower forward ends of the braces 20 project somewhat beyond the bolts 15 and serve to receive the rear ends of draft chains 22,—the forward ends of which latter are connected with equalizer bars 23 depending from an evener bar 24. The evener bar is supported by a bolt 25 depending from a plate 26 carried by the tongue 4. This tongue comprises two parallel members connected by cross bars 27, 28 and the plate 26 is secured at its respective ends to these cross bars,—said plate being also caused to pass under the curved forward end of the horizontal frame and thus constitute a guide loop for said frame during the movements of the latter relatively to the tongue as hereinafter more fully explained.

A toothed segment 29 is secured to one of the side members of the frame 1 and is provided with a bearing 30 for a transverse shaft 31, the other bearing 32 for this shaft being secured to the other side bar of the frame. A stop collar 33, secured to the shaft, abuts against the bearing 32 to prevent longitudinal displacement of said shaft.

The shaft 31 may be made angular in cross section, (except at the mountings of said shaft) and has secured to it, an operating lever 34 provided with the usual manually operable detent to engage the segment 29. The portion of said lever which is clamped to the shaft 31 also assists in permitting longitudinal displacement of said shaft. Depending arms 35 are adjustably secured to the shaft 31 and are connected, by rods 36 with the crank axle members,—the latter connections being conveniently effected by means of eye-bolts 37 which secure the sand bands 38 to said axle members. By manipulating the lever 34, the carrying wheels will be shifted backwardly or forwardly to effect the balancing of the cultivator when the beams 16 are raised or lowered,—such manipulation being also assisted by the action of a balancing spring 39 attached at one end to an arm 40 depending from the shaft 31 and at the other end said spring is connected with the rear frame beam 5 through the medium of an adjusting screw 41 connected with the frame beam 5 by means of a bracket 42. It is evident that when the wheels and cultivator beams are adjusted laterally as hereinbefore explained, the arms 35 should be correspondingly adjusted on the shaft 31. It is desired however, that the cultivator beams and bodies shall not have any lateral swinging movement during the normal operation of the machine, and to prevent this, the rear portions of said beams are kept properly spaced without interfering with their vertical movements or adjustments, by means of spacers 43. Each of these spacers are bowed or made arch shaped to prevent conflict with comparatively tall plants and each spacer comprises two telescoping members 44—45 to permit them to be adjusted longitudinally to accommodate the lateral adjustment of the two outer cultivator beams, said members 44—45 being normally held in their adjusted positions by means of set screws 46. The inner members 44 of the spacers 43 are bent to form pintles 47 which are mounted quite loosely in brackets 48 projecting laterally from the central cultivator beam, while the outer ends of the members 45 are bent to form elongated pintles 48 which have double or elongated bearings in brackets 49 secured to the outer cultivator beams. By thus connecting the spacers with the respective cultivator beams, they will not interfere with the independent raising of the beams, and by providing extended bearings for the pivotal connection of the arched spacers with the outer beams, said spacers will be prevented from inclining either forwardly or backwardly.

Toothed segments 50 are secured to the shaft 31 and to the frame of each of these segments, an operating lever 51 is pivotally attached and provided with detents to engage said segments. These levers are connected with the respective cultivator beams by means of rods 52,—the pivotal connections of said rods with the beams being effected through the medium of brackets 53 secured to the beams. The upper, forward ends of the rods 52 are connected with the operating levers through the medium of sleeves 54 pivoted to said levers and threaded interiorly for the passage of threaded forward portions of the rods. By thus connecting the rods with the levers, the several cultivator beams may be accurately adjusted vertically with relation to each other.

It will be seen that if the lever 34 be moved while the levers 51 are locked to their segments, the shaft 31 will be turned and all of the cultivator beams will be raised or lowered simultaneously. Operation of any one of the levers will cause the cultivator beam with which it is connected, to be raised or lowered independently of the others.

Seat bars 55 are attached at their forward ends to the intermediate braces 19 and are bent to form shoulders 56 which rest upon the rear frame beam 5, the rear portions of said seat bars being brought nearer together and disposed horizontally to receive a seat 57 which is adjustably secured thereto. Approximately in line with the seat and seat bars, a cross head 58 is pivotally mounted upon the forward cross beam 11, by means of a pivot bolt 59. Bars 60, 60 are secured at their rear ends to the cross head 58 at respective sides of the pivotal support of the latter and the forward portions of these bars are secured to the cross bars 27 and 28 which connect the parallel members of the tongue 4. Foot levers 61 are pivoted between their ends to the central braces 19 and the upper arms of these foot levers are connected, by means of rods 62 with respective ends of the cross head 58.

By operating one or the other of the foot levers, or by operating them both simultaneously in opposite directions, motion will be imparted through the rods 61 to the pivoted crosshead 58, and this cross head being rigidly connected with the tongue through the medium of the bars 60, the tendency will be to move the tongue laterally, but as the tongue cannot be thus moved laterally by reason of its connection with the team, the frame of the cultivator and the various appliances which it carries will be swung on the pivotal connection at 59 with the tongue, and thus the cultivator may be steered and the cultivator bodies kept in proper relation to the rows even though the team be more or less diverted.

Various changes might be made in the details of construction of my invention without departing from the spirit thereof or limiting its scope and hence I do not wish to restrict myself to the precise details herein set forth.

Having fully described my invention, what I claim as new and desire to secure by Letters-Patent, is:—

1. The combination with a horizontal main frame, forward and rear cross beams, and wheels, of crank axle members connected with said rear cross beam and mounted in the hubs of said wheels, plow beams carrying soil-engaging members, connections between the forward ends of said plow beams and the forward cross beam, a shaft mounted on the frame, a plurality of arms on said shaft, connections between two of said arms and the crank-axle members, an operating lever secured to the shaft, and a spring connected with one of the arms on said shaft and the rear cross beam.

2. The combination with a frame, wheels, axle members connecting said frame with the hubs of the wheels, beams carrying soil engaging members, and connections between the forward ends of said beams and the frame, of a single continuous shaft mounted on the frame, a plurality of segments secured to said shaft, levers pivoted to said segments, connections between said levers and the several beams for raising and lowering the latter separately and a lever secured to said shaft for raising and lowering said beams simultaneously.

3. The combination with a horizontal frame, wheels, crank axle members connecting the frame and wheels, and beams pivotally supported at their forward ends and provided with soil-engaging members, of a single continuous shaft mounted on the frame, a lever secured to said shaft, means for locking said lever, a plurality of segments secured to said continuous shaft, a lever pivoted to each of said last-mentioned segments, a connection between each of said plurality of levers and one of said beams and connections between said shaft and the crank axle members.

4. The combination with a horizontal frame, wheels, and crank-axle members between the frame and the wheels, of pairs of hangers depending from the forward portion of the frame, beams provided with soil-engaging members, coupling devices at the forward ends of said last-mentioned beams, bolts pivotally connecting said coupling devices with the lower ends of said hangers, and diagonal braces secured at their rear ends to the rear portion of the frame and mounted near their forward ends on said bolts, the forward ends of two of said braces projecting forwardly beyond said bolts, and constituting means for attachment of draft devices.

5. The combination with a main horizontal frame, of forward and rear cross beams secured thereto, wheels, axle members connecting the rear cross beam and the wheels, hangers depending from the forward cross beam, soil-engaging parts connected with said hangers, braces connecting the lower ends of said hangers with the rear cross beam, a tongue movable relatively to the frame, a cross head pivoted to the forward cross beam and rigidly connected with the rear end of the tongue, foot levers pivoted between their ends to said braces, and connections between the upper arms of said foot levers and said pivoted cross head.

6. The combination with a main frame, forward and rear cross beams rigid therewith, axle members connected with the rear cross beam, and wheels in which said axle members are mounted, of hangers depending from the forward cross beam, soil engaging parts connected with said hangers, diagonal braces connecting the lower ends of said hangers with the rear cross beam; seat bars attached to said diagonal braces and having shoulder resting on the rear cross beam, and a seat mounted on said seat bars.

In testimony whereof, I have signed this specification in the presence of two subscribing witnesses.

RUDOLPH J. ALTGELT.

Witnesses:
ALFRED MOOG,
G. BEHNKE.